United States Patent [19]

Hayes et al.

[11] Patent Number: 5,059,641

[45] Date of Patent: Oct. 22, 1991

[54] EPOXY MODIFIED POLYOLS AS DISPERSANTS FOR HIGH STYRENE, HIGH SOLIDS CONTENT POLYMER POLYOLS

[75] Inventors: John E. Hayes, Wilmington, Del.; Robert G. Gastinger, West Chester, PA

[73] Assignee: ARCO Chemical Technology, Inc., Wilmington, Del.

[21] Appl. No.: 463,172

[22] Filed: Jan. 10, 1990

[51] Int. Cl.$^5$ ............... C08K 5/00; C08K 5/06; C08F 8/00; C08G 18/28
[52] U.S. Cl. .................... 523/456; 524/757; 525/131; 525/404; 525/459; 528/73; 528/75; 528/83
[58] Field of Search ............ 523/456; 524/757; 525/131, 404, 459; 528/73, 75, 83

[56] References Cited

U.S. PATENT DOCUMENTS

| | | | |
|---|---|---|---|
| 4,316,991 | 2/1982 | Speranza et al. | 568/609 |
| 4,373,034 | 2/1983 | Speranza et al. | 521/177 |
| 4,495,341 | 1/1985 | Stamberger | 528/110 |
| 4,524,157 | 6/1985 | Stamberger | 521/156 |
| 4,539,339 | 9/1985 | Cuscurida et al. | 521/137 |
| 4,539,378 | 9/1985 | Cuscurida et al. | 525/407 |
| 4,585,831 | 4/1986 | Stamberger | 525/31 |
| 4,647,624 | 3/1987 | Stamberger | 525/187 |
| 4,891,395 | 1/1990 | Gastinger et al. | 528/456 |

FOREIGN PATENT DOCUMENTS 46-24255 7/1971 Japan .

Primary Examiner—John Kight, III
Assistant Examiner—T. Mosley
Attorney, Agent, or Firm—David L. Mossman; Dennis M. Kozak

[57] ABSTRACT

Very low viscosity polymer polyols having high styrene/acrylonitrile ratios and good stability may be achieved by the use of epoxy modified polyols as dispersants. The epoxy modified polyols useful as dispersants may be made by one of three methods: (1) adding the epoxy resin internally to the modified polyol, (2) capping or coupling a polyol not containing an epoxy resin with such a resin, and (3) providing the epoxy resin both internally to the polyol and as a cap or coupler. Epoxy modified polyols having a hydroxyl to epoxy ratio of about 8 or less, made by one of these techniques, are superior dispersants and provide polymer polyols having higher styrene contents, and improved stability and viscosity properties. In one aspect, the epoxy modified polyols contain a significant amount of high moleular weight polyol adducts; generally from about 5 to about 30 wt. % of materials having a GPC molecular weight of greater than 100,000; and at least greater than 80,000. Base polyols unmodified with an epoxy resin are used to make the polymer polyols.

40 Claims, No Drawings

EPOXY MODIFIED POLYOLS AS DISPERSANTS FOR HIGH STYRENE, HIGH SOLIDS CONTENT POLYMER POLYOLS

CROSS-REFERENCE TO RELATED APPLICATION

This application is related to U.S. patent application Ser. No. 07/198,035, filed May 24, 1988, relating to high styrene content, stable polymer polyols using epoxy resinmodified polyols as dispersants, now allowed.

FIELD OF THE INVENTION

The invention relates to the synthesis of polymer polyols, and, in one aspect, more particularly relates to styrene/ acrylonitrile (SAN) copolymer polyols with low viscosities employing epoxy resin-modified polyols as dispersants.

BACKGROUND OF THE INVENTION

The use of a polyol in the preparation of polyurethanes by reaction of the polyol with a polyisocyanate in the presence of a catalyst and perhaps other ingredients is well known. Conventional polyols for flexible polyurethane foams, such as slab urethane foams, are usually made by the reaction of a polyhydric alcohol with an alkylene oxide, typically ethylene oxide and/or propylene oxide, to a molecular weight of about 2,000 to 5,000 and above. These polyols are then reacted with polyisocyanate in the presence of water or other blowing agent such as fluorocarbons to obtain polyurethane foams. Polyols have been modified in many ways in attempts to improve the properties of the resulting polyurethane, for example, by using a polymer polyol as the polyol component. Conventional polyols may be used as the dispersing media or base polyol in these polymer polyols.

For example, polymer polyols containing polymers of vinyl compounds such as styrene, acrylonitrile or a mixture of the two (abbreviated as SAN monomers), or of polyurea polymers, such as those prepared from toluene diisocyanate (TDI) and hydrazine in conventional polyols have been included to improve the properties of the polyols, and thus, the properties of the resulting foam. Polyurethane foams with higher load bearing properties (ILD—indentation load deflection, and CFD—compression force deflection) may be produced in this manner. It would be desirable if polymer polyols could be prepared which would be stable and have low viscosities. Stability is important to the storage life of the polyols so that they will remain homogeneous before they are used to make the polyurethane foams. Low viscosities and small particle sizes are important in a good quality polyol to permit it to be pumped easily in high volume foam producing equipment.

It would further be desirable if styrene/acrylonitrile polymer polyols could be synthesized which would have large SAN ratios. The substitution of styrene for acrylonitrile in these polymer polyols helps prevent discoloration during the cure of the polyurethane, and also helps improve flame retardability of the resultant foams. However, the stability of the polymer polyols decreases with increasing styrene to acrylonitrile ratios. That is, the components tend to separate upon standing during storage. Viscosity and particle size are also typically adversely affected with high styrene contents.

To prepare dispersions with high styrene contents and high solids contents, it is the practice in the art to employ polyols which contain specified and ostensibly critical amounts of induced unsaturation as shown in U.S. Pat. Nos. 3,823,201; 4,454,255; 4,690,956; and others. Many of these teachings also require the use of a chain transfer agent, such as an alkyl mercaptan. In U.S. Pat. No. 4,855,330 it was discovered that epoxy modified polyols were useful as base polyols for preparing polymer polyols with high styrene contents. Patents relating to these type of modified polyols and polymer polyols include U.S. Pat. Nos. 4,316,991; 4,539,378; 4,539,339; 4,495,341; 4,647,624; and 4,585,831, and Japanese Patent Publication No. 24,255/71.

In U.S. Pat. No. 4,891,395 it was found that epoxy modified polyols were useful as dispersants for preparing polymer polyols with high styrene contents in an unmodified base polyol. The epoxy modified polyols described above were prepared from the reaction of a polyol with an epoxy resin. The ratio of hydroxy groups of the polyol to the epoxy groups of the resin was relatively high, so that excessive crosslinking did not occur and viscosity of the product was low.

SUMMARY OF THE INVENTION

Accordingly, it is an object of the present invention to provide stable, low viscosity polymer polyols of high styrene to acrylonitrile (SAN) ratios, and a method for making such polymer polyols. In one aspect of the invention, these SAN ratios may range from about 40/60 to even 100/0.

Another object of the invention is to provide stable, low viscosity polymer polyols of high SAN ratios employing epoxy resin-modified polyols as dispersants. In one aspect of the invention, the epoxy resin-modified polyol (EMP) is added to the reactor charge with the base polyol which is not modified with epoxy resin. Additional base polyol is then added in the feed stream along with the monomer component and its initiator.

It is another object of the present invention to provide a particular process for the production of the stable, low viscosity SAN polymer polyols of the present invention using epoxy resin-modified polyols as dispersants.

It has been found that epoxy modified polyols which contain a relatively low OH/epoxy ratio are superior dispersants compared to our earlier dispersants which contain a relatively high OH/epoxy ratio. These dispersants are useful in preparing polymer polyols with SAN ratios of 40/60 to 100/0, and solids contents of up to 50%. The dispersants of this invention provide polymer polyols with excellent properties even at very low levels of dispersant.

In carrying out these and other objects of the invention, there is provided, in one form, stable, low viscosity polymer polyols made by a process comprising polymerizing, via a free-radical reaction, a monomer component, in the presence of a polyol mixture comprising a major portion of a base polyol unmodified with an epoxy resin and a minor portion of an epoxy resin-modified polyol as a dispersant.

DETAILED DESCRIPTION OF THE INVENTION

It has been discovered that a process that uses epoxy modified base polyol in conjunction with an unmodified base polyol can produce polymer polyols with high styrene contents and high solids contents. It has been surprisingly discovered that the dispersant activity of the epoxy modified polyols correlates with the ratio of hydroxyl groups of the polyol to the epoxy groups in the resin (OH/epoxy) and not with the overall amount of epoxy resin. It has also been surprisingly found that epoxy modified polyols which contain a relatively low OH/epoxy ratio are far superior dispersants compared to our earlier dispersants which have a relatively high OH/epoxy ratio. These new dispersants can prepare dispersions with SAN ratios of 40/60 to 100/0, and solids contents of up to 55%. In some cases, chain transfer agents may be additionally and optionally employed to improve the appearance and filterability of the polymer polyols.

Without dispersants or other special techniques, typical conventional SAN ratios could only reach as high as the range of about 60/40-65/35, and only up to 20% solids. In contrast, the SAN ratios that can be supported by the polymer polyols of the present invention using epoxy resin-modified polyol dispersants ranged from greater than 40/60 to about 100/0, more commonly being in the range of about 65/35 to about 80/20. It has been found that epoxy modified polyols which contain a relatively low OH/epoxy ratio are superior dispersants even over those described in our U.S. Pat. No. 4,891,395 incorporated by reference herein. The examples in that application use dispersants having a OH/epoxy ratio of greater than 6.8. At the same wt.% dispersant concentration, the dispersants of this invention provide polymer polyols with better properties, such as lower viscosity, smaller average particle size, and increased stability, in comparison with conventional polymer polyols, as well as those of U.S. pat. No. 4,891,395. In addition, they permit the preparation of dispersions with increased solids contents and increased styrene contents in both slab stock and molded polyols. These dispersants can prepare dispersions with SAN ratios of 40/60 to even 100/0 and solids contents of up to 55%. The dispersants of this invention provide polymer polyols with excellent properties, comparable to commercial materials, even at very low levels of dispersant. They permit control over viscosity, stability, particle size and particle size distribution of the dispersions. Also, unlike some prior art dispersants, these EMP dispersants are free of induced unsaturation. Additionally, chain transfer agents are not required for this invention, but may be optionally used to improve the appearance and filterability of the foam.

Generally, the dispersants may be any polyols known to have been modified with epoxy resins, although polyether polyols modified with epoxy resins are a preferred group.

In a preferred embodiment of the present invention, however, the dispersant polyol is made by the method described in U.S. Pat. No. 4,316,991 to Speranza, incorporated by reference herein, referred to hereinafter as the first epoxy resin-modified polyol preparation method or first method. Briefly, these epoxy resin-modified polyols may be made by reacting a polyol initiator with one or.more alkylene oxides to extend the polyol chain, and adding epoxy resin, where the epoxy resin is added at selected points internally along the length of the polyol chain. Adding the epoxy resin during polyol alkoxylation produces polyols with internal epoxy modification.

A second method to produce polyols suitable as dispersants is to further modify polyols which are already internally epoxy modified by capping or coupling with additional epoxy resin. This would provide a highly branched polyol. The unique size and/or shape of these types of polyols would provide enhanced dispersant characteristics. A third method of producing epoxy resinmodified polyols is to only cap or couple unmodified polyols with an epoxy resin. Although not as highly branched as the polyols described above, we have found that they are also useful as dispersants.

A preferred synthesis in the procedure of the invention is the first method outlined above, for several reasons. Since the polyol synthesis is base catalyzed, adding the epoxy resin internally eliminates the necessity of recatalyzing a preformed polyol. Also, by adding the resin internally, the polyol would be more branched and is lower in viscosity.

In general, the useful initiators in making the epoxy modified polyols of the present invention may have an active hydrogen functionality of from about 3 to about 8. The alkylene oxides used in the above described procedures include, but are not necessarily limited to, ethylene oxide, propylene oxide, butylene oxide and mixtures thereof.

The reaction of the epoxy resin with the polyols causes a crosslinking of the polyol chains and leads to the formation of higher molecular weight polyol adducts with higher functionalities. The ratio of the hydroxyl groups of the polyol to the epoxy groups in the resin (OH/epoxy) determines the amount of crosslinking and also the molecular weight and molecular weight distribution of the modified polyol. The modified polyols of this invention should have a OH/epoxy ratio of less than 8, and preferably have a OH/epoxy ratio of between 8 and 2, in another aspect, less than 6, and most preferably between 4 and 2. Too many epoxy equivalents in relation to hydroxy equivalents may cause the mixture to gel because of excessive crosslinking and should be avoided. The viscosity of the dispersant is preferably less than 30,000 cps at 25° C. The amount of crosslinking and also the molecular weight and molecular weight distribution of the modified polyol is also subtly affected by process conditions such as polyol alkalinity, epoxy addition time and temperature, and location of epoxy resin in the chain. The epoxy modified polyol dispersants of this invention contain a significant amount of high molecular weight polyol adducts; generally 5 to 30%, having a GPC MW (polypropylene glycol standard) greater than 100,000; preferably, about 5 to about 30% of the material has a GPC MW greater than 80,000.

The base polyol for the polymer polyols of this invention preferably has a molecular weight up to 6500, and is typically made by the reaction of an initiator having a plurality of reactive hydrogens thereon with one or more alkylene oxides. Suitable initiators include, but are not limited to, glycerin, alkanolamines, alkyl amines, aryl or aromatic amines, sucrose, sorbitol, trimethylol propane (TMP), α-methylglucoside, α-methylglucoside or other methylglucoside, resins of phenol, aniline and mixed phenol aniline, such as methylenedianiline or bisphenol A, Mannich condensates and mixtures thereof, for example. The initiator may be a diol. The base polyol may be made by alkoxylating the initiator with a desired number of moles of an alkylene oxide. Preferably, the alkylene oxide has two or four carbon atoms, and is thus, ethylene oxide (EO), propylene oxide (PO), butylene oxide or mixtures of these oxides. The oxides may be mixed upon addition, or may be added to the polyol initiator chain separately to form blocks or caps. In a preferred aspect, a mixture of ethylene oxide and propylene oxide are added to the initiator. The alkoxylation may or may not be catalyzed; KOH is a commonly used catalyst, although others may be employed. For example, double metal cyanide catalysts may be employed, in particular zinc hexacyanocobaltate, and the polyols may be prepared in accordance with the methods described in U.S. Pat. Nos. 3,029,505; 3,900,518; 3,941,049 and 4,355,100, incorporated by reference herein. These same initiators and alkylene oxides may be utilized in the preparation of the dispersants herein also.

It is anticipated that a wide variety of epoxy resins would be useful in making the epoxy resin-modified polyols useful herein. The vicinal polyepoxide-containing compositions are organic materials having an average of at least 1.5 reactive 1,2-epoxy groups per molecule. These polyepoxide materials can be monomeric or polymeric, saturated or unsaturated, aliphatic, cycloaliphatic, aromatic or heterocyclic, and may be substituted, if desired, with other substitutents besides the epoxy groups, e.g., hydroxyl groups, ether radicals, aromatic halogen atoms and the like.

Preferred polyepoxides are those of glycidyl ethers prepared by epoxidizing the corresponding allyl ethers or reacting by known procedures, a molar excess of epichlorohydrin and an aromatic polyhydroxy compound, e.g., isopropylidene bisphenol, novolak, resorcinol, etc. The epoxy derivatives of methylene or isopropylidene bisphenols are especially preferred. The diglycidyl ether of bisphenol A is particularly useful. Some of these epoxy resins are known in the trade as "Epon" resins and may be obtained from Shell Chemical Co.

A widely used class of polyepoxides which are useful includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to prgvide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and other polymers, e.g., polyethylene glycols, polypropylene glycols, triglycerol, dipentaerythritol and the like, polyallyl alcohol, polyhydric thioethers, such as 2,2',3,3'-tetrahydroxydipropylsulfide and the like, mercapto alcohols such as monothioglycerol, dithioglycerol, and the like, polyhydric alcohol partial esters, such as monostearin, pentaerythritol monoacetate, and the like, and halogenated polyhydric alcohols, such as monochlorohydrins of glycerol, sorbitol, pentaerythritol and the like.

Another class of polymeric polyepoxides which can be amine cured and are useful includes the epoxy novolak resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolak resins can be obtained in H. Lee, et al., *Handbook of Epoxy Resins*, McGraw Hill Book Co., New York, 1967.

It will be appreciated by those skilled in the art that the polyepoxide compositions which are useful according to the procedure of making the epoxy resin-modified polyols useful in the present invention are not limited to those containing the above described polyepoxides, but that these polyepoxides are to be considered merely as being representative of the class of polyepoxides as a whole.

The reactive conditions of temperature and pressure may be selected by the invention practitioner to meet certain specifications required by the polyol for making SAN polymer polyols. A pressure of about 50 psig and a temperature of from about 50° to 150° C. are representative conditions for the making of the epoxy resin-modified polyols.

For polymer polyol preparation, the dispersant is employed in an amount from about 0.5 to 30 wt. %, preferably from about 1 to 10 wt. %, based on total composition; most preferably from about 2 to 6 wt. %. The solids content may vary from about 10 to about 55 wt. % preferably 20 to 45 wt. %. The styrene/acrylonitrile ratio may vary from about 40/60 to 100/0 depending on the solids content. For polymer polyol synthesis, it is preferred to use ethylenically unsaturated monomers which are not reactive with the free hydroxyl groups of the polyol.

The base polyol for the polymer polyol is the major portion of the polyol material used, whereas the epoxy resin-modified polyol (EMP) dispersant is a minor portion of the total polyol material used. Suitable base polyols are described above. The ratio of total base polyol (including all portions, if multiple proportions are used) to epoxy resin-modified polyol dispersant-ranges from about 50/50 to about 99/1, and preferably from about 70/30 to about 99/1.

The preparation of the polymer polyols of the present invention may be performed at a temperature in the range of 80° to 150° C., preferably in the range of about 100° to 130° C.

Any suitable addition time of the feed stream to the reactor contents may be employed, for example, the addition time may range from 0.5 to 4.0 hours, preferably 1 to 2.5 hours. The proportion of the polymerization initiator as a wt. % of the total reactants may range from 0.05 to 5.0 wt. %, preferably 0.1 to 1.0 wt. %.

The reactor for making the polymer polyols of this invention may be a batch reactor, a semi-batch reactor or one or more continuous stirred tank reactors (CSTRs). In one aspect of this invention, if a semi-batch reactor is used, the EMP dispersant may comprise all of the initial reactor charge. Alternatively, the initial reactor charge may comprise the EMP dispersant and a first portion of the base polyol. The EMP dispersant may be diluted with a first portion of base polyol up to a ratio of 1 to 50 with the remainder of the base polyol added with the feed charge. In a preferred embodiment, when two portions of base polyol are used, the first portion is less than the second portion. When two portions of base polyol are used, the ratio of the first portion to second portion may range from 1/99 to 50/50, preferably 10/90 to 35/65. The EMP dispersant is most effective when added with the initial reactor charge but is also effective if a portion is added with the feed charge. It is desirable tg have a high initial concentration of dispersant in the reactor but initial concentrations as low as about 5% are effective with about 10 to about 30% typical. In another aspect of the invention, if CSTRs are employed, the base polyol need not be added in two portions, but may be added in one portion. In yet another aspect of the invention, two or more CSTRs in series may be employed to advantage, for example, if a particular sequence of component additions is advantageous. Due to the robust nature of the dispersants of the invention, it is expected that the polymer polyols made according to the process herein may also be performed in a single stage CSTR. In some cases, the use of one CSTR may be especially preferred.

The preferred monomers employed in the method and polymer polyols of the present invention are both styrene and acrylonitrile to make a copolymer. The relative proportions of styrene to acrylonitrile, the SAN ratio, has been discussed above and will be exemplified below. Other suitable monomers include, but are not limited to, butadiene, isoprene, 1,4-pentadiene, 1,6-hexadiene, 1,7-octadiene, styrene, acrylonitrile, methacrylonitrile, α-methylstyrene, methylstyrene, 2,4-dimethylstyrene, ethyl styrene, isopropylstyrene, butylstyrene, substituted styrenes, such as cyanostyrene, phenylstyrene, cyclohexylstyrene, benzylstyrene, nitrostyrene, N,N-dimethylaminostyrene, acetoxystyrene, including halogenated styrenes, methyl 4-vinylbenzoate, phenoxystyrene, p-vinyl diphenyl sulfide, pvinylphenyl phenyl oxide, acrylic and substituted acrylic monomers such as acrylic acid, methacrylic acid, methyl acrylate, 2-hydroxyethyl acrylate, 2-hydroxyethyl methacrylate, methyl methacrylate, cyclohexyl methacrylate, benzyl methacrylate, isopropyl methacrylate, octyl methacrylate, ethyl α-ethyoxyacrylate, methyl α-acetoaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, vinyl esters, vinyl ethers, vinyl ketones, vinyl acetate, vinyl alcohol, vinyl butyrate, isopropenylacetate, vinyl formate, vinyl acrylate, vinyl methacrylate, vinyl methoxy acetate, vinyl benzoate, vinyl toluene, vinyl naphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinyl imidazole, divinyl sulfide, divinyl sulfoxide, divinyl sulfone, sodium vinyl sulfonate, methyl vinyl sulfonate, Nvinyl pyrrole, dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, ally alcohol, glycol monoesters of itaconic acid, vinyl pyridine, maleic anhydride, maleimide, N-substituted maleimides, such as Nphenylmaleimide and the like.

The polymerization initiator catalyst may be any suitable initiator for the particular monomers employed. Appropriate catalytic initiators useful in producing the polymer polyol compositions of this invention are the free radical type of vinyl polymerization catalysts, such as the peroxides, persulfates, perborates, percarbonates, azo compounds and the like. Specific examples include, but are not limited to, 2,2'-azo-bis-isobutyronitrile (AIBN), dibenzoyl peroxide, lauroyl peroxide, di-t-butyl peroxide, diisopropyl peroxide carbonate, t-butyl peroxy-2-ethylhexanoate, t-butylperneodecanoate, t-butylperbenzoate, tbutyl percrotonate, t-butyl perisobutyrate, di-t-butyl perphthalate, 2,2'-azo-bis(2-methylbutanenitrile) for example. Other suitable catalysts may be employed, of course.

EXPERIMENTAL

The following examples are given to illustrate the nature of the invention. All parts and percentages are by weights.

Procedures for Determininq Phvsical Properties of Dispersions

In the examples, the physical properties of the dispersions were determined by the following methods:
Viscosity:
Viscosities were measured using a Brookfield cone and plate viscometer, Spindle #CP-52, 20 secs$^{-1}$ at 26° C. Particle Size:
Particle sizes were measured using a Coulter N4 Particle Size Analyzer with o-xylene or isopropyl alcohol as the dispersing media.
Centrifuqable Solids:
A sample of the dispersion is centrifuged for about 24 hrs. at about 3300 rpm and 1470 radial centrifugal "g" forces. The centrifuge tube was then inverted and allowed to drain for 4 hours. The non-flowing cake at the bottom of the tube is reported as weight percent of the initial weight of the sample tested.

Procedure A

Into a 3 liter, 4-neck resin kettle equipped with stirrer, condenser, thermometer, addition tube, and under a blanket of nitrogen are charged the indicated amounts of polyol and dispersant. After heating the reactor charge to reaction temperature, the feed charge was added over the indicated time period to give a milk-white dispersion. Upon completion of the addition, the dispersion was held at reaction temperature for 0.5-1.0 hours, then the reaction mixture was stripped of residual monomers for 1.5-2.5 hours at 100°-120° C. and less than 5 mm Hg to yield the polymer polyol dispersions.

EXAMPLES 1-21

These examples demonstrate the preparation of polymer polyols using internally epoxy modified polyols as dispersants. Procedure A was used and Tables I-IV contain the amount and types of materials used and the properties of the resultant polymer polyols.

Examples 1 and 3 show the preparation of low solids content polymer polyols using EMP dispersants of the earlier invention, described in U.S. Pat. No. 4,891,395 These dispersants have a relatively high OH/epoxy ratio. Examples 2 and 4 show the advantages obtained in using EMP dispersants of our present invention which have a relatively low OH/epoxy ratio in the preparation of similar polymer polyols. A comparison of Examples 2 and 5 shows products with similar properties, yet the solids content is increased by 50% in Example 5. Examples 6-14 illustrate the usefulness of these new dispersants in the preparation of high solid content dispersions. These products have excellent properties even at very low levels of dispersants. These Examples also demonstrate that dispersant activity correlates with OH/epoxy ratio of the dispersant and not with the overall amount of epoxy resin. To produce acceptable high solids dispersions, the dispersant should have a OH/epoxy ratio of less than 8 and preferably less than 4. Examples 15-21 illustrate the preparation of very high, and unusual all styrene content dispersions using the dispersants of this invention.

Appendices A and B may be referred to for descriptions of the dispersants and the base polyols, respectively.

TABLE I

| | Polymer Polyols Made by Procedure A | | | | |
|---|---|---|---|---|---|
| | Example # | | | | |
| | 1 | 2 | 3 | 4 | 5 |
| Monomer Charge, Wt. % | 20 | 23 | 20 | 20 | 30 |
| SAN Weight Ratio | 70/30 | 70/30 | 75/25 | 75/25 | 75/25 |
| Base Polyol | A | B | C | D | D |
| Dispersant | 1 | 5 | 2 | 5 | 5 |
| OH/epoxy | 6.9 | 3.5 | 9.1 | 3.5 | 3.5 |
| % Epoxy in Dispersant | 1 | 1.5 | 1 | 1.5 | 1.5 |
| GPC % > 100K | 0 | 14 | 0 | 14 | 14 |
| % Disprst. of Total Polyol | 3 | 3 | 5 | 5 | 5 |
| % of Total Polyol in Feed | 80 | 80 | 70 | 70 | 75 |
| Init. Disp. Conc., % | 15 | 15 | 16.7 | 16.7 | 20 |
| Reaction Temp., °C. | 120 | 120 | 120 | 120 | 120 |
| Vazo 67, Wt. % | 0.5 | 0.5 | 0.25 | 0.25 | 0.38 |
| Feed, Addition Time, h. | 2 | 2 | 2 | 2 | 2 |
| Reactor Charge, g. | | | | | |
| Base Polyol | 272 | 262 | 400 | 400 | 280 |
| Dispersant | 48 | 46 | 80 | 80 | 70 |
| Feed | | | | | |
| Styrene | 280 | 322 | 300 | 300 | 450 |
| Acrylonitrile | 120 | 138 | 100 | 100 | 150 |
| Vazo 67 | 10 | 10 | 5 | 5 | 7.5 |
| Base Polyol | 1280 | 1232 | 1120 | 1120 | 1050 |
| Dispersion Properties | | | | | |
| Overall Monomer Conv., % | 93 | 95.0 | 92.5 | 93.0 | 95.2 |
| Viscosity, cps | 1510 | 1340 | 3060 | 1950 | 3220 |
| Particle size, μ | 0.97 | 0.75 | 1.47 | 0.68 | 0.78 |
| Centrifugable Solids, Wt. % | 3.9 | 2.3 | 4.4 | 2.1 | 2.6 |

TABLE II

| | Polymer Polyols Made by Procedure A | | | | |
|---|---|---|---|---|---|
| | Example # | | | | |
| | 6 | 7 | 8 | 9 | 10 |
| Monomer Charge, Wt. % | 40 | 40 | 40 | 40 | 40 |
| SAN Weight Ratio | 75/25 | 75/25 | 75/25 | 75/25 | 75/25 |
| Base Polyol | B | B | B | B | B |
| Dispersant | 3 | 4 | 6 | 5 | 5 |
| OH/epoxy | 2.3 | 2.7 | 2.9 | 3.5 | 3.5 |
| % Epoxy in Dispersant | 3 | 2.6 | 1.8 | 1.5 | 1.5 |
| GPC % > 100K | 26 | 28 | — | 14 | 14 |
| % Disprst. of Total Polyol | 4 | 3 | 3 | 3 | 4 |
| % of Total Polyol in Feed | 87 | 73 | 73 | 73 | 73 |
| Init. Disp. Conc., % | 30 | 11.3 | 11.3 | 11.3 | 15 |
| Reaction Temp., °C. | 120 | 120 | 120 | 120 | 120 |
| Vazo 67, Wt. % | 0.6 | 0.6 | 0.9 | 0.9 | 0.9 |
| Feed, Addition Time, h. | 2 | 2 | 2 | 2 | 2 |
| Reactor Charge, g. | | | | | |
| Base Polyol | 112 | 284 | 284 | 284 | 272 |
| Dispersant | 48 | 36 | 36 | 36 | 48 |
| Feed | | | | | |
| Styrene | 600 | 600 | 600 | 600 | 600 |
| Acrylonitrile | 200 | 200 | 200 | 200 | 200 |
| Vazo 67 | 12 | 12 | 18 | 18 | 18 |
| Base Polyol | 1040 | 880 | 880 | 880 | 880 |
| Dispersion Properties | | | | | |
| Overall Monomer Conv., % | 93 | 95.0 | 92.5 | 93.0 | 95.2 |
| Viscosity, cps | 4770 | 4740 | 4780 | 5130 | 4900 |
| Particle size, μ | 0.84 | 0.98 | 1.04 | 0.85 | 1.15 |
| Centrifugable Solids, Wt. % | 4.1 | 4.6 | 5.8 | 7.6 | 5.7 |

TABLE III

Polymer Polyols Made by Procedure A

| | Example # | | | |
|---|---|---|---|---|
| | 11 | 12 | 13 | 14 |
| Monomer Charge, Wt. % | 35 | 35 | 13 | 14 |
| SAN Weight Ratio | 75/25 | 75/25 | 75/25 | 75/25 |
| Base Polyol | B | B | B | B |
| Dispersant | 5 | 8 | 7 | 3 |
| OH/epoxy | 3.5 | 4.0 | 8.2 | 2.3 |
| % Epoxy in Dispersant | 1.5 | 4 | 2 | 3 |
| GPC % > 100K | 14 | 5 | 0 | 26 |
| % Disprst. of Total Polyol | 4 | 4 | 4 | 3 |
| % of Total Polyol in Feed | 73 | 73 | 73 | 60 |
| Init. Disp. Conc., % | 15 | 15 | 15 | 7.5 |
| Reaction Temp., °C. | 120 | 120 | 120 | 120 |
| Vazo 67, Wt. % | 0.6 | 0.6 | — | 0.6 |
| Feed, Addition Time, h. | 2 | 2 | 2 | 2 |
| Reactor Charge, g. | | | | |
| Base Polyol | 117 | 117 | 126 | 444 |
| Dispersant | 52 | 52 | 56 | 36 |
| Feed | | | | |
| Styrene | 525 | 525 | 525 | 525 |
| Acrylonitrile | 175 | 175 | 150 | 200 |
| Vazo 67 | 12 | 12 | 15 | 12 |
| Base Polyol | 1131 | 1131 | 1218 | 720 |
| Dispersion Properties | | | | |
| Overall Monomer Conv., % | 96.3 | 96.2 | 95.6 | 95.5 |
| Viscosity, cps | 2850 | 3420 | 2730 | 4540 |
| Particle size, μ | 1.01 | 1.6 | >3 | 0.65 |
| Centrifugable Solids, Wt. % | 4.3 | 17.0 | >30 | 5.1 |

TABLE IV

Polymer Polyols Made by Procedure A

| | Example # | | | | | | |
|---|---|---|---|---|---|---|---|
| | 15 | 16 | 17 | 18 | 19 | 20 | 21 |
| Monomer Charge, Wt. % | 20 | 20 | 20 | 20 | 20 | 20 | 20 |
| SAN Weight Ratio | 80/20 | 90/10 | 100/0 | 80/20 | 90/10 | 100/0 | 100/0 |
| Base Polyol | D | D | D | B | B | B | B |
| Dispersant | 4 | 4 | 4 | 4 | 4 | 4 | 4 |
| % Disprst. of Total Polyol | 6.25 | 6.25 | 6.25 | 4.0 | 4.0 | 8.0 | 10.0 |
| % of Total Polyol in Feed | 90 | 90 | 90 | 90 | 90 | 90 | 90 |
| Init. Disp. Conc., % | 62.5 | 62.5 | 62.5 | 40 | 40 | 80 | 100 |
| Reaction Temp., °C. | 120 | 120 | 120 | 120 | 120 | 120 | 120 |
| Vazo 67, Wt. % | 0.25 | 0.25 | 0.25 | 0.5 | 0.5 | 0.5 | 0.5 |
| Feed, Addition Time, h. | 1.5 | 1.5 | 1.5 | 1.5 | 1.5 | 1.5 | 1.5 |
| Reactor Charge, g. | | | | | | | |
| Base Polyol | 60 | 60 | 60 | 96 | 96 | 32 | 0 |
| Dispersant | 100 | 100 | 100 | 64 | 64 | 128 | 160 |
| Feed | | | | | | | |
| Styrene | 320 | 360 | 400 | 320 | 360 | 400 | 400 |
| Acrylonitrile | 80 | 40 | 0 | 80 | 40 | 0 | 0 |
| Vazo 67 | 5 | 5 | 5 | 10 | 10 | 10 | 10 |
| Base Polyol | 1440 | 1440 | 1440 | 1440 | 1440 | 1440 | 1440 |
| Dispersion Properties | | | | | | | |
| Overall Monomer Conv., % | 90.9 | 85.3 | 80.0 | 94 | 82 | 84 | 78 |
| Viscosity, cps | 2160 | 1910 | 1670 | 1230 | 1280 | 1280 | 1230 |
| Particle size, μ | 0.53 | 0.82 | 1.29 | 0.76 | 1.50 | 1.54 | 1.5 |
| Centrifugable Solids, Wt. % | 2.0 | 2.2 | 5.1 | 1.9 | 6.3 | 4.7 | 1.3 |

EXAMPLE 22

Preparation of Base Treated Polyol E

Into a 3 liter reactor fitted with a stirrer, thermometer, and addition tube and under a blanket of nitrogen were charged 2000 grams of polyol E, 16.54 grams of KOH, and 11.68 grams of water. After stirring for 15 minutes at room temperature, the mixture was heated under vacuum to 110° C. After 1 hr. at 110° C., 25 grams of toluene were added and the vacuum strip was continued for an additional 1.25 hours. Another 25 grams of toluene was added, and the mixture was again heated under vacuum for 1.25 hours. The mixture was cooled under vacuum.

EXAMPLES 23-26

These examples illustrate the preparation of terminally or capped epoxy modified polyol dispersants. The product from Example 26 was not usable as a dispersant because its viscosity was too high. The products of these Examples were prepared using Procedure B, with the amounts and materials indicated in Table V.

PROCEDURE B

A 2 liter reactor equipped with a stirrer, thermometer and addition tube and under a blanket of nitrogen was charged with the indicated amount of polyol alkoxide. The contents were heated to 110° C. The feed charge was added over a 1-2 minute period. The mixture was allowed to react for 1.5 hours. Magnesium silicate, 30 g., was added, and the reaction was held at temperature for an additional hour. The mixture was cooled to 50° C. and filtered. The filtrate was then stripped of solvent.

TABLE V

Preparation of Teminally Epoxy Modified Polyol Dispersants

| | Example # | | | |
|---|---|---|---|---|
| | 23 | 24 | 25 | 26 |
| Reactor Charge, g., Polyol from Ex. 22 | 300 | 300 | 300 | 300 |
| Feed Charge, g., | | | | |
| Epon 828 | 12.0 | 15.0 | 18.0 | 21.0 |
| Toluene | 27 | 34 | 16 | 22 |
| % Epoxy | 3.85 | 4.76 | 5.66 | 6.54 |
| Meq OH/Meq epoxy | 4.73 | 3.78 | 3.15 | 2.70 |
| Properties | | | | |
| Viscosity | 1650 | 2870 | 8110 | Gel |
| GPC % > 100K | 8 | 17 | 26 | — |

EXAMPLES 27-29

These Examples demonstrate the preparation of polymer polyols using the terminally or capped epoxy modified polyols of Examples 23-25 as dispersants. Procedure A was used and Table V contains the amount and types of materials used, and the properties of the resultant polymer polyols. These Examples also demonstrate the importance of the dispersant having a low OH-/epoxy ratio to prepare the dispersions.

TABLE VI

Polymer Polyols Made by Procedure A

| | Example # | | |
|---|---|---|---|
| | 27 | 28 | 29 |
| Monomer Charge, Wt. % | 40 | 40 | 40 |
| SAN Weight Ratio | 75/25 | 75/25 | 75/25 |
| Base Polyol | B | B | B |
| Dispersant | 704746 | 704724 | 704723 |
| Dispersant | 25 | 24 | 23 |
| OH/epoxy | 3.1 | 3.8 | 4.7 |
| % Epoxy in Dispersant | 5.7 | 4.8 | 3.9 |
| GPC % > 100K | 26 | 17 | 8 |
| % Disprst. of Total Polyol | 4 | 4 | 4 |
| % of Total Polyol in Feed | 87 | 87 | 87 |
| Init. Disp. Conc., % | 30 | 30 | 30 |
| Reaction Temp., °C. | 120 | 120 | 120 |
| Vazo 67, Wt. % | 0.6 | 0.6 | 0.6 |
| Feed, Addition Time, h. | 2 | 2 | 2 |
| Reactor Charge, g. | | | |
| Base Polyol | 112 | 112 | 112 |
| Dispersant | 48 | 48 | 52 |
| Feed | | | |
| Styrene | 600 | 600 | 525 |
| Acrylonitrile | 200 | 200 | 175 |
| Vazo 67 | 12 | 12 | 12 |
| Base Polyol | 1040 | 1040 | 1131 |
| Dispersion Properties | | | |
| Overall Monomer Conv., % | 95.3 | 96.2 | 95.6 |
| Viscosity, cps | 5220 | 4800 | 3620 |
| Particle size, μ | 0.96 | 2.26 | >2 |
| Centrifugable Solids, Wt. % | 5.0 | 9.7 | 21.5 |

EXAMPLES 30-33

Examples 30 through 31 in Table VII illustrate that the optional use of a chain transfer agent, such as dodecylmercaptan will improve the filterability of the resultant polymer polyol. Filterability, measured as percentage retained on screen (% retained), is determined by filtering a fixed quantity (e.g., 1800 gms) of the dispersion through a fixed cross-sectional area (e.g., 8-in. diameter) of a 140 mesh screen. The dispersion is filtered hot (100°-110° C.) and with slight suction. The 140 mesh screen has a square mesh with an average mesh opening of 106 microns. The amount of material retained by the screen is reported as a weight percentage based on the percent monomers.

TABLE VII

Use of a Chain Transfer Agent in Polymer Polyols

| | Example # | | | |
|---|---|---|---|---|
| | 30 | 31 | 32 | 33 |
| Monomer Charge, Wt. % | 35 | 35 | 45 | 45 |
| SAN Weight Ratio | 75/25 | 75/25 | 75/25 | 75/25 |
| Base Polyol | D | D | B | B |
| Dispersant | 6 | 6 | 4 | 4 |
| % Disprst. of Total Polyol | 5 | 5 | 4 | 4 |
| % of Total Polyol in Feed | 70 | 70 | 85 | 85 |
| Init. Disp. Conc., % | 16.7 | 16.7 | 16.7 | 16.7 |
| Reaction Temp., °C. | 120 | 120 | 120 | 120 |
| Vazo 67, Wt. % | 0.44 | 0.44 | 0.9 | 0.9 |
| Chain Transfer Agent, Wt. % | 0 | 0.44 | 0 | 0.3 |
| Feed, Addition Time, h. | 2 | 2 | 2 | 2 |
| Reactor Charge, g. | | | | |
| Base Polyol | 325 | 325 | 121 | 121 |
| Dispersant | 65 | 65 | 44 | 44 |
| Feed | | | | |
| Styrene | 525 | 525 | 675 | 675 |
| Acrylonitrile | 175 | 175 | 225 | 225 |
| Vazo 67 | 8.75 | 8.75 | 18 | 18 |
| Base Polyol | 910 | 910 | 935 | 935 |
| Dispersion Properties | | | | |
| Overall Monomer Conv., % | 96.9 | 96.1 | 97.6 | 97.1 |
| Viscosity, cps | 5400 | 5800 | 8180 | 7700 |
| Particle size, μ | 0.85 | 1.08 | 0.92 | 1.57 |
| Centrifugable Solids, Wt. % | 3.1 | 4.1 | 6.5 | 8.9 |
| Filterability % Retained on Screen | 0.14 | 0 | 1.3 | 0 |

SYNTHESIS OF POLYURETHANE FOAMS

In accordance with this invention, the polyether polyols described herein may be used to make polyurethane foams. These include both ethylene oxide (EO) capped polymer polyols and those not capped with EO. In one aspect, the polyol is typically made by the reaction of an initiator having a plurality of reactive hydrogens thereon with one or more alkylene oxides. Suitable initiators include, but are not limited to, glycerin, alkanolamines, alkylamines, aryl or aromatic amines, sucrose, sorbitol, trimethylol propane (TMP), α-methylglucoside, β-methylglucoside or other methyl-glucoside, resins of phenol, aniline and mixed phenol aniline, such as methylenedianiline or bisphenol A, Mannich condensates and mixtures thereof, for example. The base polyol may be made by alkoxylating the initiator with a desired number of moles of an alkylene oxide. Preferably, the alkylene oxide has two or four carbon atoms, and is thus, ethylene oxide, propylene oxide, butylene oxide or mixtures of these oxides. The oxides may be mixed upon addition, or may be added to the polyol initiator chain separately to form blocks or caps. In one aspect, a mixture of ethylene oxide and propylene oxide are added to the initiator. The alkoxylation may or may not be catalyzed; KOH is a commonly used catalyst, although others may be employed. For example, double metal cyanide catalysts may be employed, in particular zinc hexacyanocobaltate, and the polyols may be prepared in accordance with the methods described in U.S. Pat. Nos. 3,029,505; 3,900,518; 3,941,049 and 4,355,100, incorporated by reference herein. If molded polyurethane foams are desired, then the polyol chosen may be one with a functionality adapted more appropriately to molded foams. Alternatively, various polymer polyols may also be employed as completely replacing or in conjunction with suitable polyol components.

A catalyst is typically employed in preparing polyurethane foams in the conventional manner. Such a catalyst may include one or more of the following:

(a) Tertiary amines such as trimethylamine, triethylamine, N-methylmorpholine, N-ethylmorpholine, N,N- dimethylbenzylamine, N,N-dimethylethanolamine, N,N,N',N'-tetra-methyl-1,3-butanediamine, N,N-dimethylpiperazine, 1,4diazobicyclo[2.2.2]octane and the like;

(b) Tertiary phosphines such as trialkylphosphines, dialkylbenzylphosphines, and the like;

(c) Strong bases such as alkali and alkaline earth metal hydroxides, alkoxides, and phenoxides;

(d) Acidic metal salts of strong acids such as ferric chloride, stannic chloride, stannous chloride, antimony trichloride, bismuth nitrate and chloride, and the like;

(e) Chelates of various metals such as those which can be obtained from acetylacetone, benzoylacetone, trifluoroacetyl acetone, ethyl acetoacetate, salicyclaldehyde, cyclopentanone-1-carboxylate, acetylacetoneimine, bisacetylacetonealkylenediamines, salicyclaldehydeimine, and the like, with various metals such as Be, Mg, Zn, Cd, Pd, Ti, Zr, Sn, As, Bi, Cr, Mo, Mn, Fe, Co, and Ni;

(f) Alcoholates and phenolates of various metals such as $Ti(OR)_4$, $Sn(OR)_4$, $Al(OR)_3$, and the like, wherein R is alkyl or aryl, and the reaction products of alcoholates with carboxylic acids, beta-diketones, and 2-(N,N-dialkylamino)alkanols;

(g) Salts of organic acids with a variety of metals such as alkali metals, alkaline earth metals, Al, Sn, Pb, Mn, Co, Ni and Cu, including, for example, sodium acetate, stannous octoate, stannous oleate, lead octoate, metallic driers such as manganese and cobalt naphthenate, and the like; and (h) Organometallic derivatives of tetravalent tin, trivalent and pentavalent As, Sb, and Bi and metal carbonyls of iron and cobalt.

Of course, combinations of any of the above polyurethane catalysts may be employed. Usually, the amount of catalyst employed ranges from about 0.01 to about 5.0 parts by weight percent based on 100 parts by weight of the polyol. More often the amount of catalyst used is 0.2 to 2.0 parts by weight.

The polyol component for the polyurethane foam is reacted in the presence of one or more of the above catalysts with a polyisocyanate according to conventional procedures. The polyisocyanate used may be any aromatic or aliphatic polyisocyanate, such as toluene diisocya-nates (TDIs), polymeric isocyanates and aliphatic diisocyanates. Typical aromatic polyisocyanates include, but are not limited to, m-phenylene diisocyanate, p-phenylene diisocyanate, polymethylene polyphenyl-isocyanate, 2,4-toluene diisocyanate, 2,6-toluene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,2-diisocyanate, xylylene-1,3-diisocyanate, bis(4-isocyanatophenyl)-methane, bis(3-methyl-4-isocyanatophenyl)methane, and 4,4'-diphenylpropane diisocyanate. Suitable aliphatic diisooyanates would include isophorone diisocyanate, hexamethylene diisocyanate, and methylene-bis-cyclohexylisocyanate. Toluene diisocyanates are preferred, in one aspect of the invention.

Aromatic polyisocyanates suitable for use include methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts.

Foaming is carried out in the presence of water and, optionally, additional organic blowing agents. The water is normally used in amounts of 0.5 to 15 parts by weight, preferably, 1.0 to 10 parts by weight (pbw) based on 100 pbw of the polymer polyol and any additional polyol present. The organic blowing agents optionally used along with the water are known in the art and are, for example, monofluorotrichloromethane, difluorodichloro-methane, methylene dichloride and others generally known in the art. Additives to regulate the cell size and the cell structure, for example, silicone surfactant such as dimethylpolysiloxanes, may also be added to the foaming mixture. Fillers, dyes, fire retardant additives or plasticizers of known types may also be used, of course. These and other additives are well known to those skilled in the art.

For more information on preparing polyurethanes, particularly flexible polyurethanes, see U.S. Pat. Nos. 4,338,408; 4,342,687 and 4,381,353, incorporated by reference herein. Conventional reaction conditions may be employed in making the polyurethane foams of this invention.

GLOSSARY

EPON(R) 828 Diglycidyl ether of bisphenol A made by Shell Chemical Co.

Vazo(R) 67 2,2'-Azobis(2-methylbutanenitrile) polymerization catalyst made by E. I. duPont de Nemours and Co.

Many modifications may be made in the polymer polyols of the present invention without departing from the spirit and scope thereof which are defined only by the appended claims. For example, one skilled in the art may find that certain reaction conditions or reaction sequences, or particular components or proportions give polymer polyols with certain advantageous properties.

APPENDIX A

Description of Dispersants

Dispersants 1 through 8 are internally epoxy modified polyols and were prepared as outlined in U.S. Pat. No. 4,316,991. Dispersants 1 and 2 were described in U.S. patent application Ser. No. 07/198,035.

Dispersant 1

A glycerin started polyether of propylene oxide capped with ethylene oxide containing 14.6% ethylene oxide and having a hydroxyl number of 25.3 and an unsaturation content of 0.010 meq/g modified with 1.0% Epon 828. The OH/epoxy ratio is 6.9. The GPC% greater than 100K (100,000)=0.

Dispersant 2 (Thanol ® 5507)

A glycerin started polyether of propylene oxide capped with ethylene oxide containing 16% ethylene oxide and having a hydroxyl number of 34 modified with 1.0 wt. % Epon 828. The OH/epoxy ratio is 9.1. The GPC% greater than 100K=0.

Dispersant 3

A glycerin started polyether of propylene oxide having a hydroxyl number of 33 modified with 3.0 wt. % Epon 828. The OH/epoxy ratio is 2.3, and the GPC% greater than 100K =26.

Dispersant 4

A glycerin started polyether of propylene oxide having a hydroxyl number of 27.1 modified with 2.6 wt. % Epon 828. The OH/epoxy ratio is 2.7, and the GPC% greater than 100K =28.

Dispersant 5

A glycerin started polyether of propylene oxide and ethylene oxide, containing 15.0 wt. % EO, and having a hydroxyl number of 23.0 modified with 1.5 wt. % Epon 828. The OH/epoxy ratio is 3.5, and the GPC% greater than 100K =14.

Dispersant 6

A glycerin started polyether of propylene oxide and ethylene oxide, containing 15.8 wt. % EO, and having a hydroxyl number of 21.5 modified with 1.8 wt. % Epon 828. The OH/epoxy ratio is 2.9, and the GPC% greater than 100K =16.

Dispersant 7 (Thanol 3502)

A glycerin started polyether of propylene oxide having a hydroxyl number of 49.8 modified with 2.0 wt. % Epon 828. The OH/epoxy ratio is 8.2, and the GPC% greater than 100K =0.

Dispersant 8

A glycerin started polyether of propylene oxide having a hydroxyl number of 54.0 modified with 4.0 wt. % Epon 828. The OH/epoxy ratio is 4.0, and the GPC% greater than 100K =5.

APPENDIX B

Description of Base Polyols

Polyol A (Arcol® 1130)

A glycerin started polyether of propylene oxide and ethylene oxide containing 10% random ethylene oxide having a hydroxyl number of 48.

Polyol B (Arcol® 1131)

A glycerin started polyether of propylene oxide and ethylene oxide containing 12% random ethylene oxide having a hydroxyl number of 48.

Polyol C (Thanol® 5505)

A glycerin started polyether of propylene oxide capped with ethylene oxide containing 21% ethylene oxide having a hydroxyl number of 34.

Polyol D (Arcol® 1342)

A trimethylolpropane started polyether of propylene oxide capped with ethylene oxide containing 14% ethylene oxide having a hydroxyl number of 34.

Polyol E

A glycerin started polyether of propylene oxide and ethylene oxide containing 8% random ethylene oxide having a hydroxyl number of 56.

We claim:

1. Stable, low viscosity polymer polyols made by a process comprisign polymerizing, via a free-radical reaction, an addition polymerizable monomer component with ethylenic unsaturation, in the presence of a polyol mixture comprising a major portion of a base polyol unmodified with an epoxy resin and a minor portion of an epoxy modified polyol as a dispersant, where the dispersant has a ratio of hydroxyl equivalents to epoxy equivalents equal to or less than 6.8, where the polymer polyols have lower viscosity compared with the polymer polyols made where the dispersant has a ratio of hydroxyl equivalents to epoxy eqivalents greater than 6.8, and where the epoxy is an organic material having an average of at least 1.5 reactive 1,2-epoxy groups per molecule.

2. The stable, low viscosity polymer polyols of claim 1 where the epoxy modified polyol dispersant is made by a process comprising adding an epoxy resin during alkoxylation of a polyol initiator to give a polyol dispersant with the epoxy resin present internally in the dispersant.

3. The stable, low viscosity polymer polyols of claim 2 where the epoxy modified polyol dispersant is made by reacting a polyol initiator having an active hydrogen functionality of 3 to 8 and one or more alkylene oxides with an epoxy resin in such a manner that the epoxy resin is added internally along the length of the resultant epoxy modified polyol.

4. The stable, low viscosity polymer polyols of claim 1 where the epoxy modified polyol dispersant is made by a process comprising adding an epoxy resin during alkoxylation of a polyol initiator and after the polyol initiator alkoxylation to give a polyol dispersant with the epoxy resin present internally and present as a cap or coupler on the dispersant polyol.

5. The stable, low viscosity polymer polyols of claim 4 where the epoxy modified polyol dispersant is made by reacting a polyol initiator having an active hydrogen functionality of 3 to 8 and one or more alkylene oxides with an epoxy resin in such a manner that the epoxy resin is added internally along the length of the resultant epoxy modified polyol, and where an epoxy resin is also added as a coupler or cap after the alkylene oxide addition.

6. The stable, low viscosity polymer polyols of claim 1 where the epoxy modified polyol dispersant is made by a process comprising adding an epoxy resin after the alkoxylation of a polyol initiator to give a polyol dispersant with the epoxy resin present only as a cap or coupler on the end of the alkoxylated polyol.

7. The stable, low viscosity polymer polyols of claim 6 where the epoxy modified polyol dispersant is made by reacting a polyol initiator having an active hydrogen functionality of 3 to 8 with one or more alkylene oxides, and then adding an epoxy resin as a coupler or cap after the alkylene oxide addition.

8. The stable, low viscosity polymer polyols of claim 1 where the monomer component is a combination of styrene and acrylonitrile in a ratio of styrene to acrylonitrile ranging from about 40/60 to about 100/0, and having a solids content of 55% or less.

9. The stable, low viscosity polymer polyols of claim 1 where the epoxy modified polyol dispersant has a OH/epoxy ratio of between about 4 and about 2.

10. Stable, low viscosity polymer polyols made by a process comprising polymerizing, via a free-radial reaction, an addition polymerizable monomer component with ethylenic unsaturation, in the presence of a polyol mixture comprising a major portion of a base polyol unmodified with an epoxy resin and a minor portion of an epoxy modified polyol as a dispersant, where the dispersant has a ratio of hydroxyl equivalents to epoxy equivalents equal to or less than 6, and a viscosity of less than 30,000 cps at 25° C., and where the polymer polyols have lower viscosity compared with the polymer polyols made where the dispersant has a ratio of hydroxyl equivalents to epoxy equivalents greater than 6, where the epoxy is an organic material having an average of at least 1.5 reactive 1,2-epoxy groups per molecule.

11. The stable, low viscosity polymer polyols of claim 10 where the epoxy modified polyol dispersant is made by reacting a polyol initiator having an active hydrogen functionality of 3 to 8 and one or more alkylene oxides with an epoxy resin in such a manner that the epoxy resin is added internally along the length of the resultant epoxy modified polyol.

12. The stable, low viscosity polymer polyols of claim 10 where the epoxy modified polyol dispersant is made by reacting a polyol initiator having an active hydrogen functionality of 3 to 8 and one or more alkylene oxides with an epoxy resin in such a manner that the epoxy resin is added internally along the length of the resultant epoxy modified polyol, and where an epoxy resin is also added as a coupler or cap after the alkylene oxide addition.

13. The stable, low viscosity polymer polyols of claim 10 where the epoxy modified polyol dispersant is made by reacting a polyol initiator having an active hydrogen functionality of 3 to 8 with one or more alkylene oxides, and then adding an epoxy resin as a coupler or cap after the alkylene oxide addition.

14. The stable, low viscosity polymer polyols of claim 10 where the epoxy modified polyol dispersant has a OH/epoxy ratio of between about 4 and about 2.

15. Stable, low viscosity polymer polyols made by the process comprising the steps of:
charging at least an epoxy modified polyol dispersant to a reactor as a minor portion of a total polyol component;
feeding an addition polymerizable monomer component with ethylenic unsaturation, an initiator suitable for polymerizing the monomer component and a base polyol to the reactor, where the base polyol is a major portion of the total polyol component and is unmodified with epoxy resin; and
polymerizing the monomer component in the presence of the base polyol and the epoxy modified polyol dispersant,
where the dispersant has a ratio of hydroxyl groups to epoxy groups of less than 6.8, where the polymer polyols have lower viscosity compared with the polymer polyols made where the dispersant has a ratio of hydroxyl equivalents to epoxy equivalents greater than 6.8, and where the epoxy is an organic material having an average of at least 1.5 reactive 1,2-epoxy groups per molecule.

16. The stable, low viscosity polymer polyols of claim 15 where the epoxy modified polyol dispersant is made by reacting a polyol initiator having an active hydrogen functionality of 3 to 8 and one or more alkylene oxides with an epoxy resin in such a manner that the epoxy resin is added internally along the length of the resultant epoxy modified polyol.

17. The stable, low viscosity polymer polyols of cliam 15 where the epoxy modified polyol dispesant is made by reacting a polyol initiator having an active hydrogen functionality of 3 to 8 with one or more alkylene oxides, and then adding an epoxy resin as a coupler or cap after the alkylene oxide addition.

18. The stable, low viscosity polymer polyols of claim 15 where the epoxy modified polyol dispersant has a OH/epoxy ratio of between about 4 and about 2.

19. A method for making stable, low viscosity polymer polyols comprising the steps of:
making an epoxy modified polyol dispersant by modifying a polyol with an epoxy resin, such that the ratio of hydroxyl equivalents to epoxy equivalents is less than 6.8; and
polymerizing, via a free-radical reaction, an addition polymerizable monomer component with ethylenic unsaturation, in the presence of a polyol mixture comprising a major portion of a base polyol unmodified with an epoxy resin and a minor portion of the epoxy modified polyol as a dispersant, and
where the polymer polyols have lower viscosity compared with the polymer polyols made where the dispersant has a ratio of hydroxyl equivalents to epoxy equivalents greater than 6.8, and where the epoxy is an organic material having an average of at least 1.5 reactive 1,2-epoxy groups per molecule.

20. THe method of claim 19 where the step for making the epoxy modified polyol dispersant further comprises adding the epoxy resin during alkoxylation of the polyol initiator to give a polyol dispersant with the epoxy resin present internally in the dispersant.

21. The method of claim 19 where the step for making the epoxy modified polyol dispersant further comprises reacting a polyol initiator having an active hydrogen funtionality of 3 to 8 and one or more alkylene oxides with the epoxy resin in such a manner that the epoxy resin is added internally along the length of the resultant epoxy modified polyol.

22. The method of claim 20 where the step for making the epoxy modified polyol dispersant further comprises adding the epoxy resin during alkoxylation of a polyol initiator and after the polyol initiator alkoxylation to give a polyol dispersant with the epoxy resin present internally and present as a cap or coupler on the dispersant polyol.

23. The method of claim 22 where the step for making the epoxy modified polyol dispersant further comprises reacting a polyol initiator having an active hydrogen functionality of 3 to 8 and one or more alkylene oxides with the epoxy resin in such a manner that the epoxy resin is added internally along the length of the resultant epoxy modified polyol, and where the epoxy resin is also added as a coupler or cap after the alkylene oxide addition.

24. The method of claim 19 where the step for making the epoxy modified polyol dispersant further comprises adding an epoxy resin after the alkoxylation of a polyol initiator to give a polyol dispersant with the epoxy resin present only as a cap or coupler on the end of the alkoxylated polyol.

25. The method of claim 24 where the step for making the epoxy modified polyol dispersant further comprises reacting a polyol initiator having an active hydrogen functionality of 3 to 8 with one or more alkylene oxides, and then adding an epoxy resin as a coupler or cap after alkylene oxide addition.

26. The method of claim 19 where the epoxy modified polyol dispersant has a OH/epoxy ratio of between about 4 and about 2.

27. Polyurethane products made by a process comprising reacting a polymer polyol with an organic polyisocyanate in the presence of a polyurethane catalyst, where the polymer polyol is made by a process comprising polymerizing, via a free-radical reaction, an addition polymerizable monomer component with ethylenic unsaturation, in the presence ofa polyol mixture comprising a major portion of a base polyol unmodified with an epoxy resin and a minor portion of an epoxy modified polyol as a dispersant, where the dispersant has a ratioof hydroxyl equivalents to epoxy equivalents equal to or less than 6.8, and where the polymer polyols have lower viscosity compared with the polymer polyols made where the dispersant has a ratio of hydroxyl equivalents to epoxy equivalents greater than 6.8, and where the epoxy is an organic material having an average of at least 1.5 reactive 1,2-epoxy groups per molecule.

28. An epoxy modified polyol made by reacting an initiator having a functionality between about 3 and about 8 with one or more alkylene oxides and an epoxy containing compound where the epoxy containing compound is an organic material having an average of at least 1.5 reactive 1,2-epoxy groups per molecule, where the epoxy modified polyol has a ratio of hydroxyl equivalents to epoxy equivalents equal to or less than 6.8.

29. The epoxy modified polyol of claim 28 where the epoxy modified polyol is made by a process comprising adding an epoxy resin during alkoxylation of a polyol initiator to give an epoxy modified polyol with the epoxy resin present internally.

30. The epoxy modified polyol of claim 28 where the epoxy modified polyol is made by reacting a polyol initiator having an active hydrogen functionality of 3 to 8 and one or more alkylene oxides with an epoxy resin in such a manner that the epoxy resin is added internally along the length of the resultant epoxy modified polyol.

31. The epoxy modified polyol of claim 28 where the epoxy modified polyol is made by a process comprising adding an epoxy resin during alkoxylation of a polyol initiator and after the polyol initiator alkoxylation to give an epoxy modified polyol with the epoxy resin present internally and present as a cap or coupler on the epoxy modified polyol.

32. The epoxy modified polyol of claim 28 where the epoxy modified polyol is made by reacting a polyol initiator having an active hydrogen functionality of 3 to 8 and one or more alkylene oxides with an epoxy resin in such a manner that the epoxy resin is added internally along the length of the resultant epoxy modified polyol, and where an epoxy resin is also added as a coupler or cap after the alkylene oxide addition.

33. The epoxy modified polyol of claim 28 where the epoxy modified polyol is made by a process comprising adding an epoxy resin after the alkoxylation of a polyol initiator to give an epoxy modified polyol with the epoxy resin present only as a cap or coupler on the end of the alkoxylated polyol.

34. The epoxy modified polyol of claim 28 where the epoxy modified polyol is made by reacting a polyol initiator having an active hydrogen functionality of 3 to 8 with one or more alkylene oxides, and then adding an epoxy resin as a coupler or cap after the alkylene oxide addition.

35. The epoxy modified polyol of claim 28 where the epoxy modified polyol has a OH/epoxy ratio of between about 4 and about 2.

36. The stable, low viscosity polymer polyols of claim 1 where the dispersant has a ratio of hydroxyl equivalents to epoxy equivalents between 2 and 6.8.

37. The stable, low viscosity polymer polyols of claim 15 where the dispersant has a ratio of hydroxyl equivalents to epoxy equivalents between 2 and 6.8.

38. The method of claim 19 where in making the epoxy modified polyol dispersant the ratio of hydroxyl equivalents to epoxy equivalents is between 2 and 6.8.

39. The polyurethane products of claim 27 where the dispersant has a ratio of hydroxyl equivalents to epoxy equivalents between 2 and 6.8.

40. The epoxy modified polyol of claim 28 where the ratio of hydroxyl equivalents to epoxy equivalents is between 2 and 6.8.

* * * * *